(12) United States Patent
Smole

(10) Patent No.: US 6,935,572 B1
(45) Date of Patent: Aug. 30, 2005

(54) TEMPERATURE DIFFERENTIAL ELIMINATOR

(76) Inventor: Lewis T. Smole, 235 Maylawn Ave., Wadsworth, OH (US) 44281

(*) Notice: Subject to any disclaimer, the term of this patent is extended or adjusted under 35 U.S.C. 154(b) by 0 days.

(21) Appl. No.: 10/979,717

(22) Filed: Nov. 2, 2004

(51) Int. Cl.[7] ............................ G05D 15/00; G01F 1/68
(52) U.S. Cl. ................ 236/78 R; 236/91 G; 73/204.19
(58) Field of Search ........................... 236/78 R, 91 G, 236/49.3, 91 D, 91 F, 1 C; 73/204.19, 204.15, 73/204.16; 361/106; 165/243

(56) References Cited

U.S. PATENT DOCUMENTS

| | | | |
|---|---|---|---|
| 3,192,302 A | | 6/1965 | Keefer |
| 3,555,386 A | | 1/1971 | Wisman |
| 3,564,205 A | * | 2/1971 | Tyler .......................... 219/499 |
| 4,072,268 A | | 2/1978 | Perris |
| 4,124,793 A | | 11/1978 | Colman |
| 4,192,456 A | | 3/1980 | Shields et al. |
| 4,310,047 A | | 1/1982 | Branson |
| 5,587,520 A | | 12/1996 | Rhodes |
| 6,813,131 B2 | * | 11/2004 | Schmalz ..................... 361/105 |

FOREIGN PATENT DOCUMENTS

| | | |
|---|---|---|
| DE | 41 23 352 A1 | 1/1993 |
| GB | 529805 | 11/1940 |
| GB | 710764 | 6/1954 |
| GB | 761565 | 11/1956 |
| GB | 905213 | 9/1962 |
| GB | 1 274 283 | 5/1972 |

* cited by examiner

*Primary Examiner*—Chen Wen Jiang
(74) *Attorney, Agent, or Firm*—Hahn Loeser & Parks LLP

(57) ABSTRACT

The present invention relates to a device and method for providing precise temperature control using inexpensive temperature controllers and/or thermostats. Specifically the invention provides modifications to either a temperature controller and/or a thermostat that enables precise temperature control using inexpensive components. The series rheostat type differential eliminator (SRDE) is an inexpensive circuit that interfaces between a temperature controller and a thermistor or other temperature sensor element. The SRDE is essentially a circuit that switches the thermistor between a shunt and a rheostat in a manner that reduces or eliminates the temperature differential, while preventing the system from going into "chatter." The heating resistor type differential eliminator (HRDE) is an inexpensive and simple circuit design that uses a thermostat and heating resistor to provide both direct and accurate temperature control for a heating and/or cooling control element, while also preventing the system from chattering. Either of these devices can be used with a temperature-controlled device for sleeping. Both the SRDE and HRDE embodiments reduce the temperature differential of simple automatic temperature controllers so that they are better capable of achieving precise temperature control.

10 Claims, 3 Drawing Sheets

SERIES RHEOSTAT TYPE DIFFERENTIAL ELIMINATOR

SERIES RHEOSTAT TYPE DIFFERENTIAL ELIMINATOR

HEATING RESISTOR TYPE DIFFERENTIAL ELIMINATOR

Temperature Control Device For Sleeping (3 views)

TEMPERATURE DIFFERENTIAL ELIMINATOR

CROSS REFERENCE TO RELATED APPLICATIONS/INCORPORATION BY REFERENCE

This invention is related to the inventor's "Temperature Control Device for Sleeping," U.S. Pat. No. 6,425,527, which is hereby incorporated by reference.

FIELD OF THE INVENTION

The present invention relates generally to feedback-loop based temperature control circuits. In particular, it relates to an apparatus, process and method of reducing the temperature differential of simple, inexpensive temperature control devices so that they can be used for precision temperature control. The series rheostat type differential eliminator circuit allows accurate temperature regulation using an inexpensive temperature controller. The heating resistor type differential eliminator circuit allows accurate and direct temperature regulation using an inexpensive thermostat.

BACKGROUND OF THE INVENTION

Automatic temperature control devices are well known in the art of temperature control. A temperature controller is an instrument used to control temperature. Many prior art temperature controllers have temperature sensors for determining the ambient temperature within a controlled volume. The temperature controller attempts to maintain a set-point or "ideal" temperature within the controlled volume by regulating the output from a control element such as a heater or fan. The temperature controller attempts to reach a steady state where the temperature of the controlled volume is consistent with the set-point temperature.

There are several basic types of temperature controllers. One type is an on-off controller. Others are the proportional and the proportional with integral and derivative control (PID). The on-off controller is the simplest form of temperature control devices. This type of controller simply maintains the control element in either an on or off state. Once the temperature rises above or falls below the set-point temperature, the controller changes state, switching the output. For example, when an on-off controller is used for cooling, the output is on when the temperature is above the set-point and off when the temperature is below the set-point. The temperature must rise above or fall below the set-point temperature before the output of the control element changes.

Complicated and expensive temperature controllers have an inherent problem in reaching the set-point temperature. As the temperature of the control volume nears the set-point temperature, the control element may stay on too long or turn off too soon, which will result in the condition called overshooting or undershooting. Overshooting results when the temperature rises above the set-point temperature and undershooting results when the temperature falls below the set-point temperature. This may result in a process of the temperature cycling continually, rising above or falling below the set-point temperature before a steady state is reached. Because there is no "middle state" between on and off, the controller rapidly switches the temperature control element off and on as the actual temperature hovers around the set-point temperature. This condition is known as "chattering." Chattering may damage the heating or cooling elements in a temperature control system due to the increased duty-cycle on the devices as they are rapidly turned off and on.

To compensate for "chattering" in on-off controllers, manufactures design a "hysteresis" or temperature differential into the controller. A hysteresis or temperature differential is essentially a buffer or delay in the control circuit. This buffer is a temperature range near the set-point temperature in which the controller operates. The actual temperature must be out side this range before the controller changes state, turning the control element on or off again. Thus, the temperature differential prevents the controller from switching the control elements on and off rapidly around the set-point temperature. In prior art systems this differential may be designed in to the circuit, controller software or it may be inherent to the system, due to the characteristics of the electronics or materials used. Though they are typically inexpensive, these controllers are not usually used where precise temperature control is required.

SUMMARY OF THE INVENTION

Embodiments of the present invention represent advancements in the art of temperature control devices in that an inexpensive method of correcting temperature differentials in a feedback loop temperature control system is provided. Inexpensive on-off temperature controllers regulate a control element (i.e. heating or cooling mechanism) by turning the device on or off until it reaches an ideal or set-point temperature. Therefore, the on-off temperature controller will switch the output only when the temperature crosses the set-point. Temperature differentials or "hysteresis," are present in the feedback loop and aids the system in reaching a steady state. This steady state condition prevents the controller from "chattering" or rapidly turning off and on once the system reaches the set-point temperature. Many inexpensive systems have ample differential which keeps the system from chattering. If the system is allowed to "chatter" the components of the system may become damaged because of the increased duty cycle. Unfortunately, these temperature differentials also prevent the controllers from being used in applications where precise and accurate temperature control is required.

By way of illustration, the functionality of the temperature control circuit can be described by the following example. If the controller is used in a cooling application, the output of the control element is on when the temperature is above the set-point and off when the temperature is below the set-point. There is no inherent "middle state." However, adding a temperature differential to the system creates a steady state or "middle state" region. When a temperature differential is introduced into the system the temperature must exceed the set-point by a certain amount before the cooling system turns on again. For example, the set-point temperature may be seventy degrees, however the system may be designed to switch on once the temperature reaches 72 degrees and switch off once the temperature falls to 68 degrees. This deviation of +/−2 degrees is the temperature differential.

In many inexpensive systems, the temperature differential occurs as a matter of design. In others the temperature differential may be a result of the characteristics of the material used in manufacturing the temperature controller. The nature of on-off temperature control design renders these systems unsuitable for application requiring precise temperature control. The temperature differential prevents these devices from reaching a precise temperature; instead, these controllers can only provide temperature control within a specific range around an ideal temperature. The present invention however, allows these inexpensive temperature controllers to be adapted for more precise temperature control without significantly increasing costs.

Various embodiments of the differential eliminator circuits provide both a means and method of using an inexpensive on-off temperature controller in an application where precise temperature control is required. The series rheostat type differential eliminator (SRDE) is an inexpensive circuit that interfaces between a temperature controller and a thermistor or other temperature sensor element. The SRDE is essentially a circuit that switches the thermistor between a shunt and a rheostat in a manner that reduces or eliminates the temperature differential, while preventing the system from going into "chatter." Essentially, the SRDE is a device for temperature control comprising a temperature controller having a temperature differential. It also uses a thermistor responsive to temperature. The thermistor typically has at least two leads, one of which is connected to the temperature controller and the second lead being connected to the temperature controller through a switch. The switch is designed to selectively switch the second thermistor lead in series with either a rheostat or a shunt. Both the rheostat and/or shunt is then connected to the temperature controller. The rheostat is proportionally adjusted to increase a total resistance of between the thermistor and the controller reducing the temperature differential.

Similar to the SRDE circuit, the heating resistor type differential eliminator (HRDE) is an inexpensive, simple circuit design that uses a thermostat and heating resistor to provide both direct and accurate temperature control for a heating and/or cooling control element, while also preventing the system from chattering. Specifically, the HRDE is a device for temperature control comprising a thermostat responsive to changes in temperature, where the thermostat has a temperature differential. A heating resistor is positioned to provide heat to the thermostat. Air circulation near the thermostat is provided by a fan. A fan speed controller varies the speed of the fan and, thus the air flowing near the thermistor. Both the thermostat and heating resistor is switchably connected to the fan speed controller. The heating resistor is designed to remain off when the fan speed controller operates the fan at high speeds. Conversely, the heating resistor is designed to remain on when the fan speed controller operates the fan at low speeds, such that the temperature differential of the thermostat is reduced. Either of these devices can be used with a temperature controlled device for sleeping. Both the SRDE and HRDE embodiments reduce the temperature differential of simple automatic temperature controllers so that they are better capable of achieving precise temperature control.

DETAILED DESCRIPTION

Figure 1:
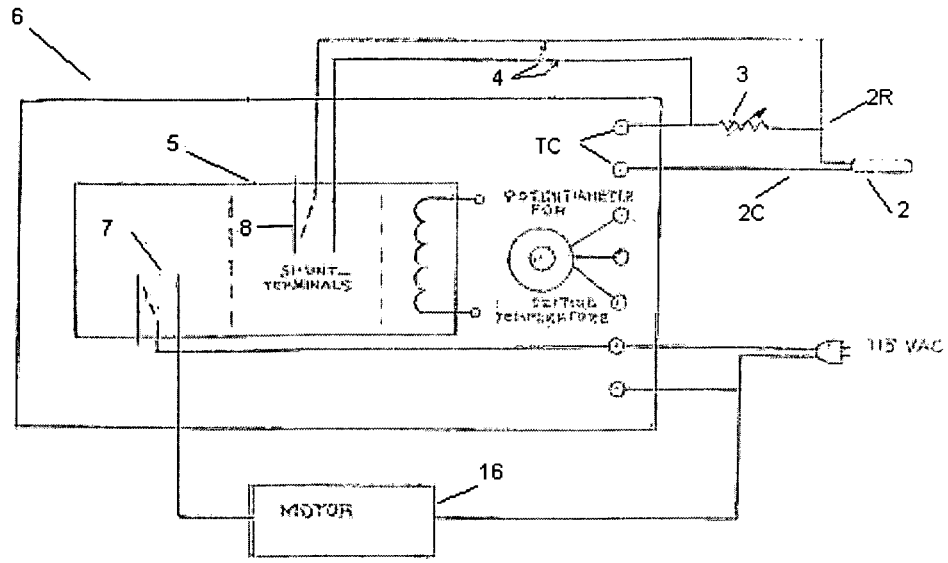
FIG. 1 illustrates an embodiment of a schematic diagram of the Series Rheostat Type Differential Eliminator circuit, in accordance with various aspects of the present invention.

Embodiments of the present invention improve the accuracy of simple, inexpensive temperature controllers by adjusting their temperature differential. Particularly, embodiments of the present invention reduced the temperature differential of on-off temperature controllers and thermostats to a precise range. Electronic components are switched into and out of the temperature control feedback loop through a process that reduces the temperature differential while allowing the system to operate within a temperature control range that prevents chatter.

Series Rheostat Type Differential Eliminator

The "Series Rheostat Differential Eliminator (SRDE)" circuit improves the accuracy of inexpensive temperature controllers by making the temperature differential or "hysteresis" of these circuits adjustable. Automatic on-off temperature controllers seek to reach an ideal temperature within a control volume. The ideal temperature is referred to as the set-point temperature. The on-off temperature controller will maintain a heating or cooling apparatus in either an on or off state as the temperature rises above or falls below the set-point temperature. Once the temperature rises above or falls below this temperature, the controller changes state, switching the output on or off. For example, when an on-off controller is used for cooling, the cooling output is on when the temperature is above the set point and off when the temperature is below the set-point. Therefore, the temperature must rise above or fall below the set-point to change the output of the cooling system. As the temperature rises and falls near the set-point, the system begins to cycle on and off rapidly, a condition called "chattering". This cycling around the set-point temperature can cause damage to the cooling or heating apparatus. Chattering also prevents the system from reaching steady state as the temperature consistently overshoots or undershoots near the set-point temperature. To compensate for this condition, manufactures will often introduce a buffer or range of temperatures around the set-point such that the system does not rapidly change state once it reaches a specific temperature. For example, in a system with a set-point temperature of 70° F., the system may be designed to turn off at 68° F. and back on at 72° F. This creates a 4° F. temperature differential. The temperature differential allows the system to reach a steady-state within a specific range before the system changes state.

Temperature differentials may also be inherent to the temperature control system as a result of the quality of materials used in manufacturing the controller. Inexpensive temperature controllers may have errors or temperature differentials within the system that vary by several degrees.

While the design of on-off temperature controllers provides an effective and inexpensive system of automatic temperature control, these designs are not appropriate for applications requiring accurate and precise temperature control. Designers are often forced to use more expensive temperature controllers for designs requiring precise temperature control. An embodiment of the present invention provides a low-cost upgrade to an inexpensive temperature controller so that it can be used to maintain a specific temperature without the problems of "chattering" that occur in prior art temperature controllers.

The SRDE circuit consists mainly of a thermistor that is switchable in series with a rheostat and a shunt. A thermister is a device that varies its resistance with temperature. A rheostat is a variable resistor used to control current that is independent of temperature. A shunt is simply a wire or short circuit that has little or no resistance. The thermistor is used to sense the ambient temperature of air flowing through a control volume. The resistance in the thermistor changes as the ambient temperature changes. This measure of current and/or resistance can be used to determine the temperature of the environment near the thermistor. Some thermistors have a very slow response time. This slow response time may allow the actual temperature to change several degrees before it is reported back to the temperature controllers. Therefore, the thermistor's response time may also contribute to the temperature control system's hysteresis.

Referring to FIG. 1, the thermistor 2 is placed within a volume for sensing the temperature of the ambient air. One lead 2r from thermistor 2 is connected in series to both a rheostat 3 and a shunt 4. The other lead 2c from the thermistor 2 is connected to a terminal Tc on the temperature controller 6. Similar to a potentiometer, the resistance of the rheostat 3 can be adjusted such that the temperature differential is significantly reduced and while allowing the temperature control system to function without "chatter."

The temperature differential of the temperature control circuit can be adjusted or reduced by changing resistance values in the temperature control circuit. An adjustable resistor, called a rheostat, can help reduce or eliminate the temperature differential in a temperature control circuit. Simple mathematical formulas are used to derive the proper adjustment of the resistance of the rheostat 3. In the equations below, ($D_K$) represents the known temperature differential of the temperature controller and thermistor, measured in degrees. The quantity ($D_R$) represents the desired temperature differential, also measured in units of degrees. In order to adjust the rheostat to compensate for the temperature differential, both the thermistor resistance ($R_K$) at the set-point temperature ($T_S$) and the required number of degrees of temperature differential reduction ($T_D$) of the control system must be known.

First the amount $T_D$ of temperature differential reduction is calculated by subtracting the desired temperature differential ($D_R$) from the known temperature differential ($D_K$):

$$T_D = D_K - D_R;$$

Next the number of degrees required to reduce the temperature differential is used to calculate the percentage reduction ($P_E$):

$$P_E = T_D / T_S;$$

This percentage ($P_E$) is multiplied by the resistance of the temperature controller at the set point temperature ($R_K$) to determine the resistance needed to reduce the temperature differential ($R_R$):

$$R_R = P_E \times R_K$$

$$R_A = R_R + R_K$$

The variable $R_A$ represents the total resistance of the control system that is necessary to reduce the temperature differential to the desired level. For example, a temperature differential of 4° F. can be reduced to a more precise temperature differential of 0.5° F. using the equations above. If the resistance of the temperature controller at the set point temperature ($R_K$), is measured as 20,000 ohms when the temperature is 70° F. in a circuit with a 4° F. temperature differential, the resistance ($R_R$) of the circuit at a reduced differential of 0.5° F. can be calculated. The desired temperature differential of 0.5° F. ($D_R$) is subtracted from the known differential of 4° F. ($D_K$), which equals 3.5° F. of differential reduction ($T_D$). The differential reduction temperature ($T_D$) is then divided into the set-point temperature ($T_S$) of 70° F. to determine the percentage of resistance (in this example $P_E = 5\%$) needed to reduce the temperature differential. The rheostat resistance ($R_R$) is calculated by multiplying the percentage of resistance ($P_E$) by the thermistor resistance ($R_K$) at 70° F., which yields 1,000 ohms, the rheostat resistance ($R_R$). The rheostat is set at 1,000 ohms, which results in a total resistance across the circuit of 21,000 ohms ($R_A$). This adjustment results in the circuit having a reduced temperature differential of 0.5° F. ($D_R$).

When the rheostat is adjusted, the differential eliminator circuit is functional. By way of example, the functionality of the SRDE circuit is described when the temperature controller is used in a cooling application with a set-point temperature of 70° F. Referring to FIG. 1, at an actual temperature of 70° F. the temperature controller with the rheostat in place, registers a temperature of 73.5° F. The controller may need to see a current change corresponding to 74° F. before the controller will switch on. Thus, the actual temperature may fluctuate between 70 and 70.5° F. before the cooling system switches on. Once the temperature increases by 0.5° F., the controller sees a temperature of 74° F. When this occurs there is enough current flowing through the circuit to cause a state change in the temperature controller.

Figure 3:
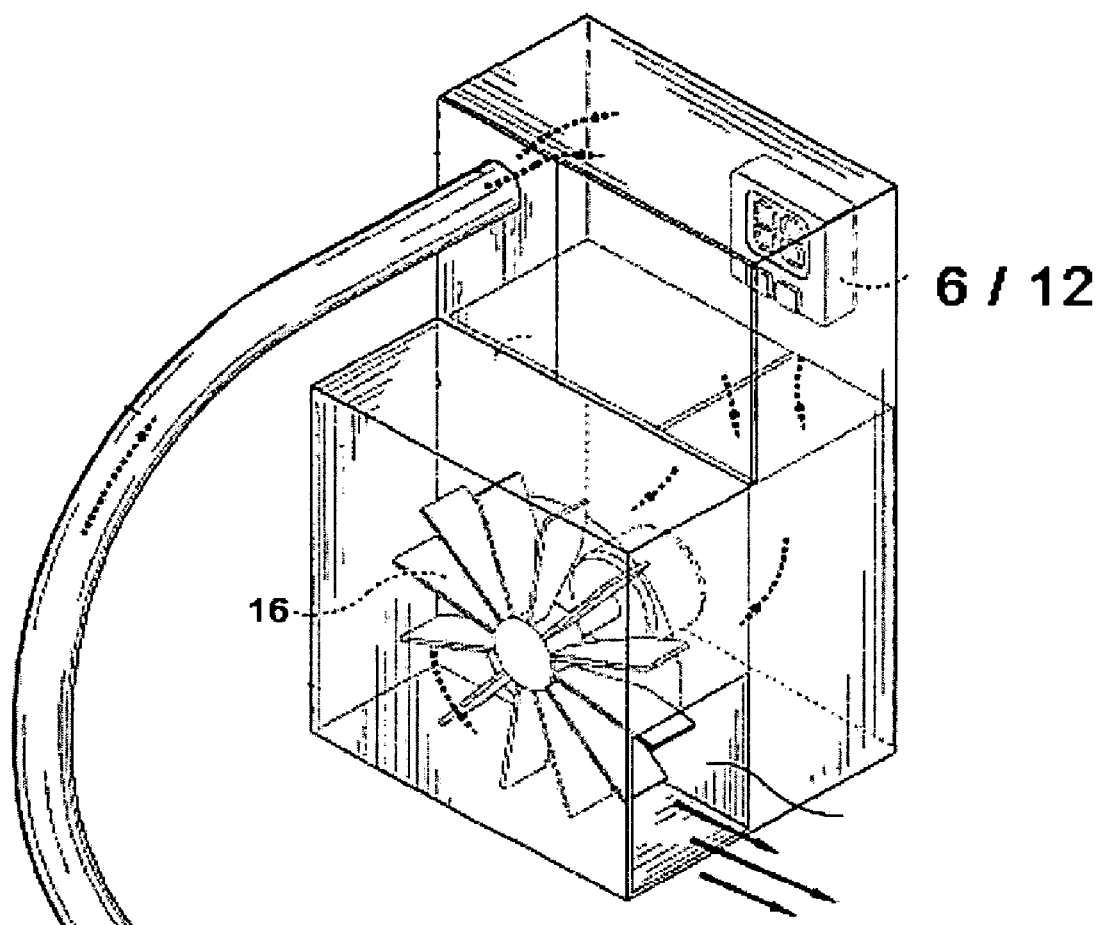
FIG. 3 is a perspective view of the Differential Eliminator circuit of FIG. 1 or 2, connected to a cooling apparatus in accordance with an embodiment of the present invention.

The operation of the SRDE circuit can further be described as the system changes state. The effect of the rheostat on the temperature controller results in the temperature controller registering a temperature of 74° F. when the actual temperature is only 70.5° F. Once the temperature controller registers a temperature of 74° F., the system begins to change state, resulting in the cooling element being turned on. Referring to FIGS. 1 and 3, at a registered temperature of 74° F., the temperature controller sends a current through the coil in the output relay 5, which creates a magnetic field that causes the switch 7 in the relay to turn on the cooling element 16 (i.e. fan) and to flip the switch 8 to the shunt 4. Essentially, a shunt provides a path of least resistance or a short-circuit. Current traveling from the terminal Tc to the thermistor 2 and through the return lead 2r, will travel through the shunt 4 first if it is a closed circuit because the resistance is lower. Thus, when the controller 6 flips the switch to the shunt 4, the rheostat 3 is inoperative.

When the shunt 4, is switched on, the temperature controller measures the temperature directly from the thermistor 2. This results in the temperature controller 6 registering the true, actual temperature. The temperature controller 6 is designed to maintain the set-point temperature at 70° F. with a 4° F. temperature differential. When the shunt 4 is switched on, the temperature controller registers the actual temperature of 70.5° F. When this occurs, the temperature controller sees a drop in temperature from 74° F. to 70.5° F., a differential of 3.5° F. Therefore the system maintains its current state (i.e. cooling) until the temperature drops another 0.5° F.

With the cooling element switched on, the actual temperature eventually falls to 70° F. Once the temperature controller measures a 4° F. drop in temperature to 70° F., it triggers a state change. When this occurs, the temperature controller 6 will stop sending current through the output relay 5, which causes the switches 7 and 8 to turn the cooling element off and switch from the shunt 4 to off. The effect of switching between the shunt off and on prevents the system from "chattering" because the temperature controller is "tricked" into maintaining its present state until it registers what it believes to be a 4° F. drop in temperature. With the rheostat 3 operational, the temperature controller 6 again measures a temperature of 73.5° F. The temperature controller will maintain the current state until the temperature rises to 74° F. Thus, the temperature controller's effective temperature differential has been reduced from 4° F. to a more precise 0.5° F.

With the rheostat 3 operational, the temperature controller 6 measures a temperature of 73.5° F. again and the process repeats itself. This system may be applied to either a positively or negatively biased thermister by reversing the sequence of applying the shunt. The addition of the series rheostat differential eliminator creates an inexpensive temperature controller that can more precisely maintain a steady state temperature.

Heating Resistor Type Differential Eliminator

The "Heating Resistor Type Differential Eliminator (HRDE)" circuit performs substantially the same function as the "Series Rheostat Type Differential Eliminator," however it can be used to control the heating and/or cooling element directly, without a separate temperature controller. The HRDE replaces the temperature controller entirely and provides direct on/off operation of the control element. This method is significantly less expensive because the temperature control device is not required.

Figure 2:
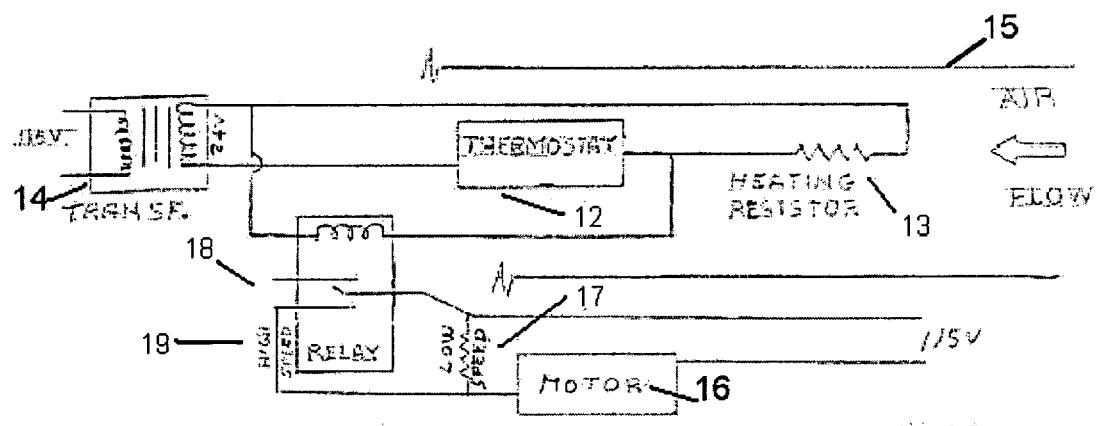
FIG. 2 illustrates an embodiment of a schematic diagram of the Heating Resistor Type Differential Eliminator circuit, in accordance with various aspects of the present invention.

Referring to FIG. 2, the heating resistor type differential eliminator circuit uses a thermostat 12, in series with a heating resistor 13 and powered by a transformer 14. By way of example only, the thermostat 12 and heating resistor 13 are both placed inside the control volume, in this example, an air suction tube 15. The control element, in this case a cooling fan, in the circuit represented by the motor 16. This cooling fan 16 is always on and normally controlled by the low speed resistor 17. When the temperature of the air in the control volume rises to the set-point temperature, the relay switch 18 flips, turning the high-speed 19 fan control on.

Thermostats have a temperature differential similar to temperature controller devices. The thermostat in the present example requires a temperature change of at least 4° F. before it changes state. Therefore, if the desired temperature were 70° F., the temperature would have to increase to almost 74° F. before the temperature control system would turn on. The present invention attempts to compensate for this error by "tricking" the thermostat into measuring a warmer temperature.

The present invention uses a four-watt heating resistor to increase the temperature around the thermostat. The wattage of the heating resistor will vary depending on the application in which the circuit is used. The heating resistor 13 is positioned up stream in the air suction tube so that air flows past the resistor before it reaches the thermostat. When the cooling fan 16 is on low speed, the heating resistor 13 is on. The heating resistor 13 increases the temperature of the air flowing past the thermostat 12. The heating resistor 13 generates enough heat such that when the actual temperature in the air suction tube rises above 70.5° F., the resistor increases the temperature of the air flowing to the thermostat to 74° F. Once the thermostat 12 measures a temperature of 74° F., it directs current away from the heating resistor 13, while supplying current to the output relay 18. This turns off the heating resistor 13 and creates a magnetic field in the coils of the relay 18. The magnetic field in the relay 18 forces the load switch of the fan motor 16 to switch from the low speed 17 terminal to the high speed terminal 19. The high-speed terminal 19 is simply a shunt that supplies the full 115 volts of power to the motor 16 of the cooling fan. The fan 16 then blows at full speed, drawing more air through the control volume, reducing the temperature. This increased airflow cools the heating resistor 13, which is now off. Once the thermostat 12 measures a temperature below 70° F., the cooling fan 16 is switched to low speed and the heating resistor 13 is turned back on, repeating the cycle.

The process in the previous example effectively reduces the temperature differential of the thermostat from 4° F. to 0.5° F., by keeping the temperature of the control volume in the range of 700 to 70.5° F. The wattage of the heating resistor and the temperature differential of the thermostat will vary for other applications. Also, the quantity of temperature differential reduction will vary by application as well. Each of these factors will play a role in the process used to select the wattage of the heating resistor.

A process similar to titration or trial and error can be used to select a resistor of appropriate wattage. The positioning of the heating resistor also plays a factor in selecting the appropriate wattage. For example, four watts may be required when the resistor is in the space that houses the thermostat. However, the wattage may be reduced to two watts if the resistor is taped to the thermostat. The wattage may be reduced even further, even below one watt, if the resistor is attached to the bi-metal plate in a mechanical thermostat. These and other factors would play a crucial role in determining the design of the temperature differential eliminator circuit.

Temperature Control Device For Sleeping

Figure 4:
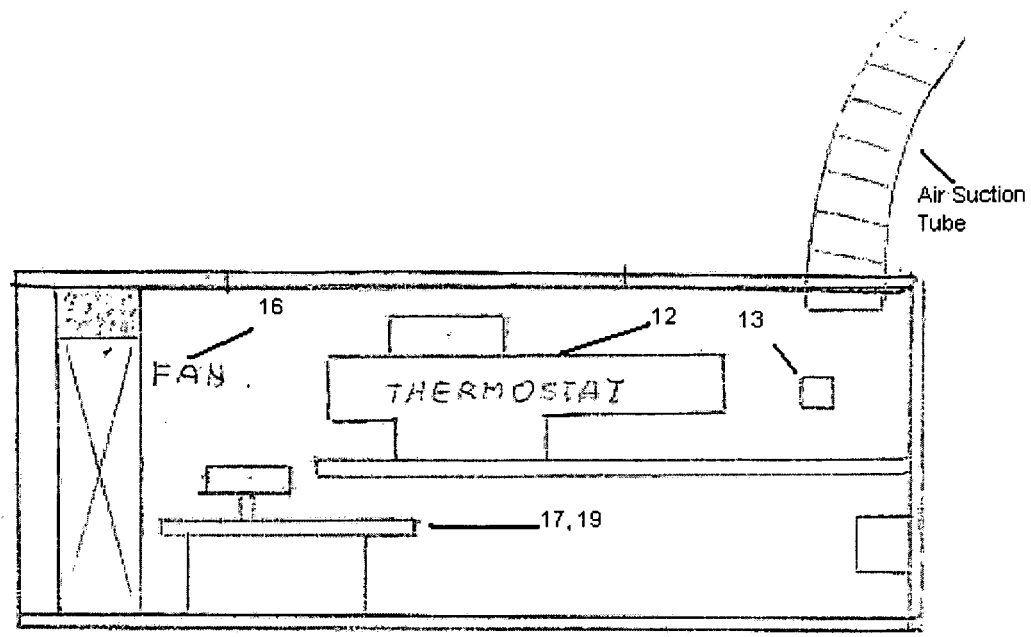
FIG. 4 illustrates a Heating Resistor Type Differential Eliminator circuit connected to the air circulation tube of a temperature control device for sleeping.
Figure 4:
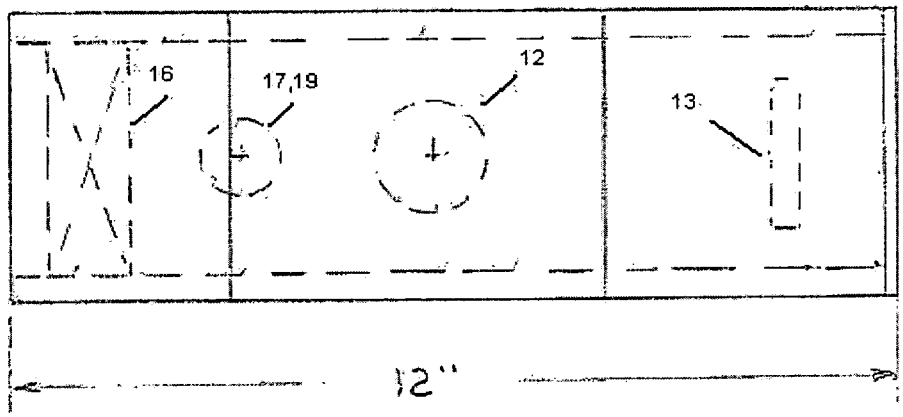
Figure 4:
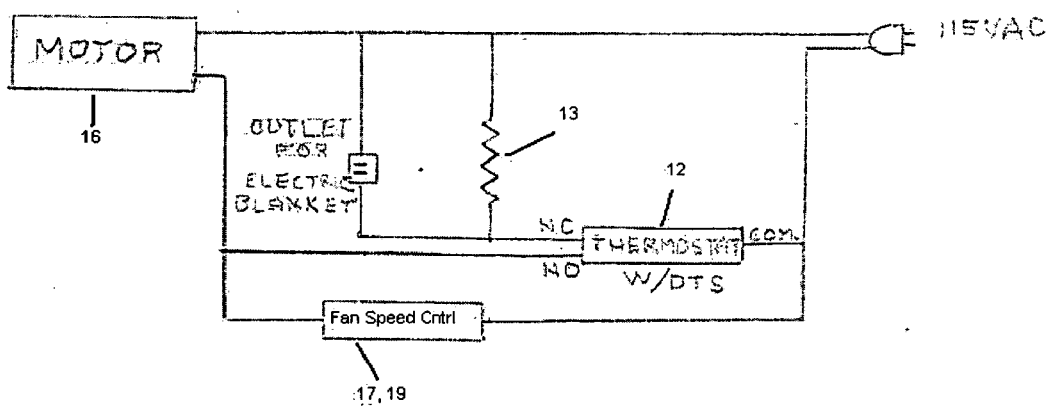

U.S. Pat. No. 6,425,527 describes a temperature control device for sleeping. This device relates generally to a apparatus for controlling the temperature of a person's sleeping surface. Specifically, this invention is a device circulates air through a perforated pad upon which a person sleeps. The amount of air circulated through the pad is dependent upon the temperature of the sleep surface. A temperature controller is used to regulate the temperature of air flowing through the pad by increasing or decreasing the speed of an air circulation fan attached to the pad. The temperature controller attempts to reach a set-point temperature by controlling the speed of the fan. As shown in FIG. 4, either of the temperature differential eliminator circuits described above (the HRDE type is shown in FIG. 4) may be used to enable an inexpensive temperature controller to precisely regulate the temperature of the pad. However, the temperature differential eliminator circuits have multiple applications beyond the temperature control device for sleeping. In fact, they can be used in most applications where precise temperature control is required from an inexpensive temperature controller.

CONCLUSION

Various modifications may be made to the device without departing from the scope of the claims. For example, the thermistor in the SRDE circuit may be replaced with a thermocouple or the rheostat may be replaced with a potentiometer. Those skilled in the art will appreciate the numerous changes and modifications that may be made to embodiments of the invention and those changes and modifications may be made without departing from the spirit of the invention. It is therefore intended that the appended claims cover all such equivalent variations as fall within the true spirit and scope of the invention.

What is claimed is:

1. A temperature control circuit, said temperature control circuit comprising:

a temperature controller having multiple inputs and a temperature differential;

a rheostat;

a shunt; and a thermistor responsive to temperature and having multiple lead wires, wherein one thermistor lead wire is connected to a first temperature controller input and a second thermistor lead wire is connected to a second temperature controller input by a switching means that selectively switches said rheostat or said shunt in series between said second thermistor lead wire and said second temperature controller input, wherein said rheostat is proportionally adjustable to increase a total resistance between said temperature control circuit, resulting in a reduction in said temperature differential of said temperature controller.

2. The temperature control circuit according to claim 1, wherein said rheostat changes the total resistance of said temperature control circuit.

3. The temperature control circuit according to claim 2, wherein said changed total resistance of the temperature control device causes said temperature controller to sense a temperature higher than an actual ambient temperature.

4. The temperature control circuit according to claim 3, wherein said temperature controller changes state once a temperature different than said set-point temperature is reported by said thermistor circuit.

5. The temperature control circuit according to claim 4, wherein a change in state of said temperature controller affects an operation of a heating and/or a cooling element.

6. The temperature control circuit according to claim 4, wherein said switching means renders said rheostat inoperable if said temperature controller changes state due to a temperature greater than said set-point temperature.

7. The temperature control circuit according to claim 6, wherein said thermistor is connected to said second temperature controller input by said shunt while said rheostat is inoperable.

8. The temperature control circuit according to claim 6, wherein said switching means renders said rheostat operable if said temperature controller changes state due to a temperature that is lower than said set-point temperature.

9. The temperature control circuit according to claim 1, wherein said rheostat is adjusted by a. calculating a percentage of temperature differential reduction by dividing a desired temperature differential reduction quantity by a temperature differential at a set-point temperature;

b. multiplying the percentage of temperature differential reduction by a resistance of the temperature controller at the set-point temperature to determine an amount of resistance needed to reduce the temperature differential; and adjusting the rheostat to said amount of resistance needed to reduce the temperature differential.

10. The temperature control circuit according to claim 1, wherein said temperature control circuit controls a temperature of air being circulated through a temperature control device for sleeping.

\* \* \* \* \*